United States Patent [19]

Dörries et al.

[11] E Re. 31,366

[45] Reissued Aug. 30, 1983

[54] MELAMINE RESIN, PROCESS FOR ITS MANUFACTURE AND ITS USE FOR THE MANUFACTURE OF COATED WOOD-BASED MATERIALS AND LAMINATES

[75] Inventors: Peter Dörries, Frankfurt am Main; Steffen Piesch, Oberursel; Alfons Wolf, Seligenstadt, all of Fed. Rep. of Germany

[73] Assignee: Cassella Aktiengesellschaft, Frankfurt am Main, Fed. Rep. of Germany

[21] Appl. No.: 338,504

[22] Filed: Jan. 11, 1982

Related U.S. Patent Documents

Reissue of:

[64] Patent No.: 4,250,282
Issued: Feb. 10, 1981
Appl. No.: 93,292
Filed: Nov. 13, 1979

[30] Foreign Application Priority Data

Nov. 13, 1979 [DE] Fed. Rep. of Germany ..... 2851760

[51] Int. Cl.[3] ..... C08G 8/28; C08F 283/00

[52] U.S. Cl. ..... 525/509; 428/524; 428/530; 428/537; 525/420; 528/249; 528/267; 528/269

[58] Field of Search ..... 525/509, 420; 528/249, 528/267, 269; 428/524, 530, 537

[56] References Cited

U.S. PATENT DOCUMENTS

| | | | |
|---|---|---|---|
| 3,130,178 | 4/1964 | Galinke et al. | 525/420 X |
| 3,194,719 | 7/1965 | Larkin et al. | 528/249 X |
| 3,194,720 | 7/1965 | Grundus et al. | 528/249 X |
| 3,830,782 | 8/1974 | Erdmann et al. | 525/509 |
| 3,914,523 | 10/1975 | Schnee et al. | 428/528 |
| 4,076,896 | 2/1978 | Bunkowski . | |
| 4,141,872 | 2/1979 | Bunkowski . | |
| 4,185,017 | 1/1980 | Piesch et al. | 525/509 X |

FOREIGN PATENT DOCUMENTS

| | | |
|---|---|---|
| 1130284 | 2/1957 | France . |
| 2048662 | 3/1971 | France . |
| 2336446 | 7/1977 | France . |
| 748016 | 4/1956 | United Kingdom . |

*Primary Examiner*—Lucille M. Phynes
*Attorney, Agent, or Firm*—Connolly and Hutz

[57] ABSTRACT

A melamine-formaldehyde resin useful for making coated wood-based materials and laminates and having a prolonged pot life comprises (a) melamine-formaldehyde precondensation product wherein the molar ratio of melamine:formaldehyde is 1:1.4 to 1:2.6 (b) 0.1 to 1.0% by weight based on total solids, of an amine of the formula

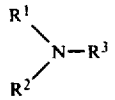

wherein $R^1$ and $R^2$ are each identical or different alkyl having 1 to 4 carbon atoms and $R^3$ is 2-hydroxyethyl, 2-(2-hydroxyethoxy)-ethyl, 3-hydroxy-1-propyl, 3-hydroxy-2-propyl, 2,3-dihydroxypropyl or $$-CH_2CH_2-NR^1R^2,$$

wherein said amine may be present entirely or partially in the form of its reaction product with the melamine-formaldehyde pre-condensation product.

11 Claims, No Drawings

MELAMINE RESIN, PROCESS FOR ITS MANUFACTURE AND ITS USE FOR THE MANUFACTURE OF COATED WOOD-BASED MATERIALS AND LAMINATES

Matter enclosed in heavy brackets [ ] appears in the original patent but forms no part of this reissue specification; matter printed in italics indicates the additions made by reissue.

Optionally partially etherified melamine-formaldehyde precondensation products and aqueous solutions thereof—generally termed melamine resins in everyday speech—are known from numerous publications.

A main field of application of such aqueous melamine resin solutions is the manufacture of coated wood-based materials and laminates. For this purpose, support materials in web form, preferably paper webs, are impregnated with the melamine resin solutions, subjected to intermediate drying and then processed under high pressure and at elevated temperature, as a rule at temperatures above 100° C., and optionally with the aid of additional auxiliary or decorative laminate materials, on the surface of wood chipboard to give coated wood-based materials, or together with paper webs impregnated with phenolic resin, to give laminates. During pressing at elevated temperature, the melamine resin undergoes complete condensation to give hard, insoluble, infusible and substantially crosslinked products, which then form an extremely resistant surface on the coated wood-based material or on the laminate. Fundamentally, with this process care must be taken that an adequate degree of condensation is reached during the curing process, since otherwise soft surfaces, which under certain circumstances are even tacky or can be easily influenced or destroyed by external chemical or physical effects, are formed. Curing, which is to be ascribed to the condensation reaction of the melamine-formaldehyde precondensation product during the pressing process, is considerably accelerated by so-called curing accelerators, which are already added to the melamine resin prior to impregnating the support webs and which are indispensible if the press time and press temperature are to be brought within ranges which are technically feasible and of interest economically.

The important criterion of the materials coated with melamine resins, that is to say the degree of condensation, can be determined by the so-called Kiton test. (The carrying-out of the Kiton test is for instance described in Examples 1 and 5 of U.S. Pat. No. 3,914,523).

However, the necessity of adding a curing agent to the melamine resin before impregnating the support webs with this resin, in order to ensure adequate curing of the resin within an acceptable press time, results in a drastic reduction in the storability of the resin. This means that only a limited time, the so-called pot life, is available for consumption of the entire amount of resin. The entire impregnating process must be completed within this time and any disturbance in the process which leads to impregnation being interrupted and thus to a delay can result in the resin already gelling or solidifying in the impregnating installation. If gelling of the melamine resin occurs, the entire residual stock of resin is unusable and must be discarded. Moreover, the solidification of an impregnating resin in the impregnating installation means that a considerable effort must be expended in cleaning and repair work on the impregnating installation.

The risks involved in the use of a resin with a short pot life have led to the development of so-called latent curing agents, the accelerating effect of which increases very greatly with increasing temperature. In fact, it is possible significantly to prolong the pot life by the use of latent curing agents. However, it has not been possible hitherto, by the use of latent curing agents, to provide a genuine safety margin against longer-lasting technical breakdowns in the plant and the resulting costs associated therewith and arising due to the gelling or solidification of the impregnating resins. It is also already known to add alkalis, in the main sodium carbonate, which render the curing agent inactive or at least drastically reduce its activity, to the resin to which curing agent has been added, should there be a disturbance in the impregnating process. Such an addition of alkali has, however, the result that the impregnating resin no longer completely cures within the press time laid down and at the conventional press temperature, and soft surfaces which are open to attack or are even tacky, are obtained. If further curing agent is added to a melamine resin to which curing agent has previously been added and which has been stabilised by the addition of alkali, in order to accelerate the curing of resin again, this as a rule results, because of the high alkali and curing agent concentrations and the high salt content, resulting therefrom, in the finished coatings, in a reduced resistance of the end product to water.

The processing of melamine resins which have been modified with specific, lower, saturated fatty acid amide derivatives in order to produce highly elastic coatings is particularly critical. Modifying agents of this type frequently tend to shorten the pot life of the unmodified resins, that is to say the so-called base resins, to a marked degree.

There was, therefore, an urgent need to provide melamine resins which have a prolonged pot life and thus have a safety margin during processing. This demand is of aggravated importance specially in the case of the fatty acid amide-modified resins, which qualitatively are particularly high-grade.

The present invention now relates to melamine resins, which, compared with the nearest comparable known resins, offer a substantially prolonged pot life, and thus improve possibilities for processing, and which, under normal pressing process conditions, give completely cured surfaces on the coated wood-based materials or laminates which are manufactured. The melamine resins according to the invention have a melamine/formaldehyde molar ratio of 1:1.4 to 1:2.6 and preferably of 1:1.5–1:2.3.

They can contain known modifying agents in the customary amounts and in particular they can also contain modifying agents which are based on lower, saturated fatty acid amides and have a particularly advantageous effect on the elasticity of the cured resin surfaces. They are characterised in that they contain 0.1 to 1.0%, preferably 0.2 to 1.0% by weight, based on solids, and most preferably 0.25 to 0.5% by weight of an amine of the formula I

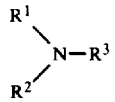

(I)

wherein $R^1$ and $R^2$ denote identical or different alkyl radicals with 1 to 4 C atoms and $R^3$ denotes 2-hydroxyethyl, 2-(2-hydroxyethoxy)-ethyl, 3-hydroxy-1-propyl, 3-hydroxy-2-propyl, 2,3-dihydroxypropyl or a radical of the formula $$-CH_2CH_2-NR^1R^2,$$

it being possible for this amine to be present entirely or partially in the form of its reaction products with the melamine-formaldehyde condensation product. Melamine resins according to the invention which contain an amine of the formula I in which $R^1$ and $R^2$ are methyl groups or in which $R^3$ is 2-hydroxyethyl or 2,3-dihydroxypropyl are preferred. Particularly preferred resins are those in which preferred elements are combined, such as, for example, those which contain dimethylethanolamine or 1-(dimethylamino)-2,3-dihydroxypropane as the amine of the formula I. A further preferred group of resins according to the invention comprises those which contain 0.5 to 40% by weight, based on solids, and preferably 2.5 to 25% by weight of modifying agents based on lower, saturated fatty acid amides. Known modifying agents of this type are, for example, the methylene-bis-formamide of the formula II

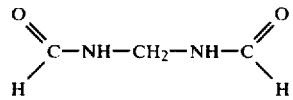

(II)

which is known from German Offenlegungsschrift No. 2,149,970, and the bis-(N-acylaminomethyl) ethers of the formula III

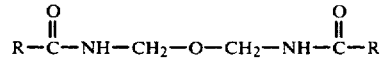

(III)

wherein R denotes hydrogen or methyl, which are known from German Offenlegungsschrift No. 2,558,148.

Further modifying agents which are based on lower, saturated fatty acid amides and can be contained in particularly preferred resins are the condensation products of ε-caprolactam, formaldehyde and formamide in a molar ratio of 1:a:b, in which a denotes a number from 1 to 20, preferably 1 to 2, and b denotes a number from 1 to 19, preferably 1, and a and b are so chosen that the quotient a/(b+1) is 0.5 to 1.

Condensation products to be mentioned in particular in this context are N-(formylaminomethyl)-ε-caprolactam and N-(N'-formyl-N'-hydroxymethyl-aminomethyl)-ε-caprolactam.

Accordingly, resins according to the invention which are particularly advantageous in respect of the pot life, the curing characteristics and technological properties of the coatings which can be manufactured therewith are those which contain, as modifying agents, 0.5 to 40% by weight and preferably 2.5 to 25% by weight of an amide of the formula II or III or of one of the abovementioned condensation products of ε-caprolactam and 0.1 to 1.0%, preferably 0.2 to 1.0% by weight of an amine of the formula I. Particularly advantageous resins which also fall within the scope of preferred resins according to the invention are those which have one or a combination of several of the preferred characteristics.

The resins according to the invention are manufactured by subjecting melamine, formaldehyde and, optionally, modifying agents which are in themselves known to a condensation reaction, in a manner which is in itself known, in the presence of customary inorganic bases in the pH range of 8.2 to 10.4 until a dilutability with water of about 1:3.0 to 1:0.8 is obtained. 0.1 to 1.0%, preferably 0.2 to 1.0% by weight, based on solids, of an amine of the formula I, in which the radicals $R^1$, $R^2$ and $R^3$ have the definitions given above, is added to the resin batch before, during or after the condensation reaction. A number of modifying agents which are in themselves known can also be added in the desired amount to the resin batch even after the condensation reaction. The adjustment of the pH value to 8.2 to 10.4, which is required for carrying out the condensation reaction, is usually effected by adding known inorganic bases, such as alkali metal hydroxides, for example sodium hydroxide or potassium hydroxide, or alkali metal carbonates, for example sodium carbonate or potassium carbonate.

If the amine of the formula I is added after the condensation reaction, which has been carried out in a manner which is in itself known using inorganic bases, a total base content which is made up of inorganic base and amine of the formula I and is slightly above the amounts of base customarily present results in the finished resin. As a rule, this slight excess of base is not disadvantageous in any way. If complete certainty that there will be no reduction of any sort in the degree of curing is desired, the amount of curing agent can be somewhat increased or the pressing conditions can be somewhat increased or the pressing conditions can be made slightly more stringent. It is also possible, but not necessary, to compensate for the slight excess of base in the finished resin by introducing that proportion of the amine of the formula I which is equivalent to the alkali present during the condensation reaction in the form of the salt of the said amine with a strong inorganic acid, such as, for example, in the form of the sulphate or of the hydrochloride, into the resin after the condensation reaction has taken place and adding the amine of the formula I in the form of the free base only in that proportion which is in excess of the abovementioned proportion. The manufacture of the products according to the invention is simplest when the amine of the formula I is already added to the reaction batch before the start of the condensation reaction. In this case, the adjustment of the pH to the value required for the condensation reaction can be achieved solely by means of this amine and the addition of inorganic bases which are in themselves known can be dispensed with. The addition of the amine before the start of the condensation reaction is therefore preferred when manufacturing the resins according to the invention.

In accordance with what has been stated above, the resins according to the invention are manufactured by subjecting melamine and formaldehyde in a molar ratio of 1:1.4 to 1:2.6 to a condensation reaction in the presence of catalytic amounts of customary basic substances as condensing agents and optionally with the addition of modifying agents, 0.1 to 1.0%, preferably 0.2 to 1.0% by weight, based on the solids content of the condensation product, of an amine of the formula I

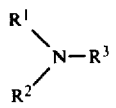

(I)

being added to the reaction mixture before, during or after the condensation reaction. If the amine is added before the condensation reaction, the addition of the catalytic amount of the customary basic structure to the reaction batch can be dispensed with.

Highly preferred resins are manufactured by subjecting melamine and formaldehyde in a molar ratio of 1:1.4 to 1:2.6 to a condensation reaction in the presence of catalytic amounts of customary basic substances as condensing agents and optionally with the addition of modifying agents, the modifying agents added to the reaction mixture being, in whole or in part, those based on lower, saturated fatty acid amides, especially those of the formula II

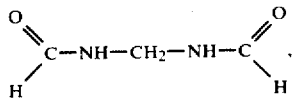

(II)

bis-(N-acylaminomethyl) ethers of the formula III

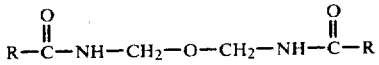

(III)

wherein R denotes hydrogen or methyl, or the condensation products of ϵ-caprolactam, formaldehyde and formamide in a molar ratio of 1:a:b, in which a denotes a number from 1 to 20, preferably 1 to 2, and b denotes a number from 1 to 19, preferably 1, and a and b are so chosen that the quotient a/(b+1) is 0.5 to 1, especially N-(formylaminomethyl)-ϵ-caprolactam and N-(N'-formyl-N'-hydroxymethyl-aminomethyl)-ϵ-caprolactam, or mixtures of these compounds, in an amount of 0.5 to 40% by weight and preferably 2.5 to 25% by weight, based on the solids content of the resin, and 0.1 to 0.8% by weight, based on the solids content of the resin, of an amine of the formula I being added before, during or after the condensation reaction.

Particularly valuable resins according to the invention are obtained when 0.1 to 1.0%, preferably 0.2 to 1.0% by weight, based on the solids content of the condensation product, of an amine of the formula I wherein $R^1$ and $R^2$ denote methyl and $R^3$ denotes hydrogen or OH is added to the reaction mixture and, furthermore, when the amine of the formula I is added prior to the condensation reaction and the addition of the catalytic amount of the basic substance otherwise customary as the condensing agent is dispensed with.

When manufacturing the resin, the condensation reaction is, as customary, continued only to an extent such that the resins still remain soluble and fusible. As a rule, the condensation reaction is continued until a limited dilutability with water is reached—in the case of the manufacture of the resins according to the invention as a rule until the dilutability with water is about 1:3.0 to 1:0.8. In some cases, for example when relatively large amounts of salts of amidosulphonic acid are added, the resulting resins can also be soluble in water in all proportions. In order to determine the dilutability with water, a sample of the resin is titrated with water at 20° C. For example, the statement "dilutability with water 1:X" signifies that 1 ml of resin can take up X ml of water at 20° C. without turbidity arising. The way in which the condensation reaction is carried out in the manufacture of aminoplasts is described in in detail in, for example, Kirk-Othmer, Encyclopedia of Chemical Technology, 1st edition, Volume 1 (1947), 756–759; Houben-Weyl "Methoden der organischen Chemie" ("Methods of Organic Chemistry"), Volume XIV/2, "Makromolekulare Stoffe" ("Macromolecular Substances"), Part 2, (1963), Georg Thieme Verlag Stuttgart, especially pages 346 to 357 (urea condensation products), pages 357–371 (melamine condensation products) and pages 382–388 (condensation products of dicyandiamide and guanidine); John F. Blais "Amino Resins", Reinold Publishing Corp., New York (1959), pages 26–53; C. P. Vale "Aminoplastics" Cleaver Hume Press Ltd., London (1950), pages 12–87 and Ullmanns Encyklopädie der technischen Chemie (Ullmann's Encyclopedia of Industrial Chemistry), 4th edition, Volume 7 (1973), pages 403 to 414.

Yet further known modifying agents, for example water-soluble mono- or di-alcohols, such as methanol, ethanol, ethylene glycol, ethylene diglycol and also pentaerythritol, carbamates, such as methyl carbamate or methoxyethyl carbamate, salts of maleamic or fumaramic acid, sugars, sorbitol, amidosulphonic acid and aromatic sulphonic acid amides or salts, can also be added when manufacturing the resins.

After the condensation reaction has ended, known curing agents or curing accelerators, for example salts of weak to strong organic acids, for example diethanolamine acetate, ethanolamine hydrochloride, ethylenediamine acetate, ammonium thiocyanate, ammonium lactate, ethylenediamine phosphate or morpholine p-toluenesulphonate, can also be added to the aminoplasts according to the invention, in order to accelerate curing.

Because of the outstanding storage stability of the resins according to the invention in the presence of known curing agents, it is also possible to add a curing agent, in the amount which suffices for through-curing, to the resins even before despatch.

The resins according to the invention are processed in a manner which is in itself known, in accordance with the prior art, by impregnating support webs, preferably paper or fabric webs, with an aminoplast according to the invention.

The impregnated and dried paper or fabric web is pressed onto a prepared wood-based panel under pressures of about 10 to 100 bars and at temperatures of about 120° to 180° C., multidaylight presses advantageously being used for pressing. Laminates can be manufactured analogously, using support webs impregnated with phenolic resin in place of the wood-based panels, and in this case moulding pressures of about 50 to 150 bars and temperatures of about 120° to 180° C. are used. Detailed data on the manufacture of coated wood-based panels and of laminates are given in J. F. Blais, loc. cit., pages 122–138; C. P. Vale, loc. cit., pages 209–214 and Ullmann, loc. cit., pages 417–418.

Compared with the nearest comparable known resins, the resins according to the invention have a considerably prolonged pot life but, nevertheless, have excellent curing characteristics, that is to say they give surface coatings with very good through-curing on normal pressing, even by the short-cycle process, with the addition of the customary amounts of curing agent. The coated wood-based materials and laminates obtained in this way have very good to excellent hardness and excellent stability to organic solvents, water, dilute aqueous acids and bases and also to steam and are distinguished by high elasticity and high, uniform gloss.

The condensation product of ε-caprolactam, formaldehyde and formamide, which can be employed as a modifying agent, can be manufactured, for example, by heating formamide and paraformaldehyde in the presence of an alkali metal hydroxide for 4 to 15 hours, whilst stirring, at temperatures of about 80° C. The reaction mixture is then acidified, for example by adding potassium hydrogen sulphate, and the ε-caprolactam is added and the batch is heated to 100° to 135° C. and the water formed during the condensation reaction is distilled off, optionally under a vacuum of about 100 to 300 mbars, it being appropriate to use an entraining agent, such as, for example, toluene. The ε-caprolactam can also already be added at the start of the reaction. The condensation products obtained after distilling off the entraining agent are in most cases clear, viscous liquids which are miscible with water in all proportions and show only a slight tendency to crystallisation, even in the undiluted state.

With a molar ratio of ε-caprolactam:formaldehyde:formamide of 1:1:1, a product which can be isolated in the pure crystalline form as N-(formylaminomethyl)-ε-caprolactam of the formula (IV)

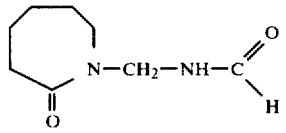

is formed on manufacture of the modifiying agent. With a molar ratio of ε-caprolactam:formaldehyde:formamide of 1:2:1, the methylolation product of N-(formylaminomethyl)-ε-caprolactam, that is to say N-(N'-formyl-N'-hydroxymethylaminomethyl)-ε-caprolactam of the formula (V)

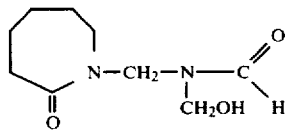

can be isolated in the pure form.

However, for use as modifying agents, the compounds of the formula IV or V do not have to be purified or isolated in the pure form; on the contrary, it suffices if the oily crude products obtained from the manufacture are used to manufacture the aminoplast resins.

The condensation product of ε-caprolactam, formaldehyde and formamide which is to be used as a modifying agent can also be added in the form of aqueous solutions.

In the illustrative examples which follow, which illustrate the manufacture of the resins according to the invention and their use, all the % data are percentages by weight, based on the solids content of the resin batch.

EXAMPLE 1

800 g of aqueous 39% strength formaldehyde, 75 g of methanol, 6.5 g of dimethylaminoethanol, 770 g of melamine and 20 g of caprolactam are stirred at 90° C. until a dilutability with water of 1:2.0 is obtained. The mixture is cooled to 20° C. and 110 g of methylene-bis-formamide are added. 1,800 g of melamine resin are obtained and, when 0.9% of morpholine p-toluenesulphonate is added as the curing agent, this resin is stable for about 2 weeks.

1.1. A white decorative paper weighing 80 g/m$^2$ was impregnated to an end weight of about 200 g/m$^2$ in the impregnating liquor, to which curing agent had been added, immediately after manufacture and was dried to a volatile content of 5.5 to 7% by weight (5 minutes/160° C.).

(The phrase 5 minutes/160° C. in this example and in all following examples means that, in order to determine the volatile content, a sample has been stored for 5 minutes at 160° C. and the volatile content has been determined from the loss in weight which has resulted during this time.)

1.1.1. Some of the papers were then pressed onto wood chipboard on a short-cycle press under a pressure of 18 to 22 bars at a temperature of 160° C. The dwell time in the press was 60 seconds. The surfaces of the coatings displayed uniform gloss and after a heat treatment of 20 hours at 140° C. showed no cracks. Curing of the surface was likewise good; the Kiton test gave a rating of 2–3.

1.1.2. Some of the impregnated papers were pressed onto wood chipboard on a short-cycle press under a pressure of 18 to 22 bars at a temperature of 180° C. and with a dwell time of 3 minutes (overcuring pressing). The surfaces of the coatings showed no cracks, coupled with uniform gloss and a very high degree of curing. The Kiton test gave a rating of 1–2.

1.1.3. Some of the impregnated papers were pressed onto wood chipboard on a multi-daylight press under a pressure of 18 to 22 bars at a temperature of 140° C. The dwell time in the press was 10 minutes. The chipboard was then cooled to a temperature of 70° to 80° C. and released from the mould. The surfaces of the coated wood chipboard displayed uniform high gloss coupled with very good curing (Kiton test rating ~2) and after a heat treatment of 20 hours at 80° C. showed no cracks.

1.2 1.2% by weight of the same curing agent, based on solid resin, were added to the resin solution of Example 1. A paper weighing 80 g/m$^2$ was impregnated in the impregnating liquor, to which curing agent had been added, and dried, as in Example 1.1. The impregnated papers were pressed in accordance with Example 1.1.2. The surfaces of the papers displayed no cracks, coupled with a uniform gloss and a very high degree of curing (Kiton test rating: 1–2).

Impregnating and pressing in accordance with Example 1.1. and 1.1.1. to 1.1.3 were repeated using the same resin, containing 0:8% of curing agent, after storing for 10 days. The results obtained were virtually the same as those obtained when the resin was processed immediately.

COMPARISON EXAMPLE 1a 800 g of aqueous 39% strength formaldehyde, 75 g of methanol, 4 g of 2 N sodium hydroxide solution, 770 g of melamine and 20 g of caprolactam are stirred at 90° C. until a dilutability with water of 1:2.0 is obtained. The mixture is cooled to 20° C. and 110 g of methylene-bis-formamide are added. 1,800 g of melamine resin are obtained and, when 0.9% of morpholine p-toluenesulphonate is added as the curing agent, this resin already shows flocculation after 18 hours and is completely solid after 3 days.

A resin of the same low stability is obtained when the modifying agent methylene-bis-formamide is replaced by the same amount of a co-condensation product of ε-caprolactam, formamide and formaldehyde in a molar ratio of 1:9:5.

Replacing the sodium hydroxide solution employed as the condensing agent by 2 g of potassium carbonate also does not result in any substantial improvement in the stability. In this case, flocculation is evident after 20 hours and solidification takes place after 3 days.

EXAMPLE 2

800 g of aqueous 39% strength formaldehyde, 75 g of methanol, 6.5 g of dimethylaminoethanol, 770 g of melamine and 20 g of caprolactam are stirred at 90° C. until a dilutability with water of 1:2.0 is obtained. The mixture is cooled to 20° C. and 110 g of a co-condensation product of ε-caprolactam, formamide and formaldehyde are added. 1,800 g of melamine resin are obtained and, when 0.9% of morpholine p-toluenesulphonate is added as the curing agent, this resin is stable for about 2 weeks.

2.1. A white decorative paper weighing 80 g/m$^2$ is impregnated to an end weight of about 200 g/m$^2$ in the impregnating liquor, to which curing agent has been added, immediately after manufacture and is dried to a volatile content of 5.5 to 7% by weight (5 minutes/160° C.).

2.1.1. Some of the papers were then pressed onto wood chipboard on a short-cycle press under a pressure of 18 to 22 bars at a temperature of 160° C. The dwell time in the press was 60 seconds. The surfaces of the coatings displayed uniform gloss and after a heat treatment of 20 hours at 140° C. showed no cracks. Curing of the surface was likewise good; the Kiton test gave a rating of 2–3.

2.1.2. Some of the impregnated papers were pressed onto wood chipboard on a short-cycle press under a pressure of 18 to 22 bars at a temperature of 180° C. and with a dwell time of 3 minutes (overcuring pressing). The surfaces of the coatings showed no cracks, coupled with uniform gloss and a very high degree of curing. The Kiton test gave a rating of 1–2.

2.2. The co-condensation product employed as the modifying agent in the above example is prepared as follows:

695 g of formamide, 195 g of ε-caprolactam, 285 g of Granuform (90% pure paraformaldehyde) and 1 g of KOH are stirred for 6 hours at 80° C., 4 g of $KHSO_4$ are then added and about 90 ml of water of reaction are distilled off at 100° C. and under a pressure of 266.6 mbars. 950 g (80%) of a clear viscous liquid which is miscible with water in all proportions are obtained.

EXAMPLE 3

3 g of 2-dimethylaminoethanol are added to a mixture of 475 g of aqueous 39% strength formaldehyde, 200 ml of water, 30 g of diethylene glycol, 15 g of methanol, 20 g of sugar and 450 g of melamine and the mixture is warmed at 90° C., whilst stirring, under a reflux condenser until the resin has a dilutability with water of 1:2.

Melamine resin with a solids content of 58.8% is obtained and, without the addition of curing agent, this is stable without change for about 21 days, after which a flocculate precipitate gradually settles out, which forms a dense precipitate after about 48 days.

If 0.8% of morpholine p-toluenesulphonate is added to the resin, the first flocks arise after about 15 days and these form a thick precipitate after 21 days.

If, in the above example, in place of 3 g of 2-dimethylaminoethanol, the same amount of 3-dimethylaminopropane-1,2-diol is employed, a melamine resin is obtained which without curing agents is stable for 12 days before the first flocculate precipitate arises and solidifies after 19 days, and with 0.8% of morpholine p-toluenesulphonate is stable for 7 days before the first flocculate precipitate arises and solidifies after 13 days.

COMPARISON EXAMPLE 3a 2.6 ml of 2 N sodium hydroxide solution are added to a mixture of 475 g of aqueous 39% strength formaldehyde, 200 ml of water, 30 g of diethylene glycol, 15 g of methanol, 20 g of sugar and 450 g of melamine and the mixture is warmed at 90° C., whilst stirring, under a reflux condenser until the resin has a dilutability with water of 1:2.

1,190 g of melamine resin with a solids content of 58.8% are obtained and, without the addition of curing agent, this resin is stable without change for about 14 days, after which a flocculate precipitate gradually settles out, which forms a dense precipitate after about 21 days. If 0.8% of morpholine p-toluenesulphonate is added to the resin, the first flocks arise after about 12 hours. The resin is completely solid after 4 days.

3.1. A white decorative paper weightng 80 g/m$^2$ was impregnated to an end weight of about 200 g/m$^2$ in the impregnating liquor, which was obtained according to Example 3 and to which curing agent had been added, immediately after the manufacture and was dried to a volatile content of 5.5 to 7% by weight (5 minutes/160° C.).

3.1.1. Some of the papers were then pressed onto wood chipboard on a short-cycle press under a pressure of 18 to 22 bars at a temperature of 160° C. The dwell time in the press was 60 seconds. The surfaces of the coatings displayed uniform gloss.

Curing of the surface was likewise good; the Kiton test gave a rating of 2–3.

EXAMPLE 4

12 g of 2-dimethylaminoethanol are added to a mixture of 940 g of aqueous, 39% strength formaldehyde, 150 ml of water, 70 g of diethylene glycol, 25 g of methanol, 70 g of 70% sorbitol and 760 g of melamine and the mixture is warmed at 90° C., whilst stirring, under a reflux condenser until the resin has a dilutability with water of 1:2.0.

2,027 g of melamine resin with a solids content of 63% are obtained and without the addition of curing agent this resin is stable without change for about 21 days.

If 1.0% of morpholine p-toluenesulphonate is added to the resin, the resin again remains stable for about 21 days.

COMPARISON EXAMPLE 4a

Example 4 is repeated, the sole difference being that, in place of the 12 g of 2-dimethylaminoethanol, 2 N sodium hydroxide solution is added dropwise until the pH value of the resin batch is 10.1. After adding the curing agent, as in Example 4, a resin is obtained in this case which already becomes turbid after 12 hours and gels after 1 to 2 days.

If the resin prepared in Example 4 is pressed as in Example 1.1 and 1.1.1, a flawless surface is obtained which in the Kiton test has a curing rating of 3.

If Example 4 is repeated except that the amounts of amine indicated in the table which follows are employed in place of the 12 g of 2-dimethylaminoethanol, the following stabilities and curing ratings by the Kiton test, with curing at 160° C./60 seconds, are obtained.

| Amine | Amount [%] | Turbidity-free stability | Curing rating (Kiton test) |
|---|---|---|---|
| Dimethylethanolamine | 0.5 | more than 15 days | 3 |
| " | 0.3 | about 12 days | 2-3 |

EXAMPLE 5

The pH value of 36.0 kg of aqueous 39% strength by weight formaldehyde solution, 3.4 kg of diethylene glycol, 1.0 kg of methanol, 2.2 kg of the sodium salt of amidosulphonic acid and and 15.0 kg of water is adjusted to 10.1 with dimethylaminoethanol and 32 kg of melamine are added. This mixture is subjected to a condensation reaction at 90° C. until the dilutability with water is 1:2.0 and is cooled to 50° C. and 5 kg of water are added. 430 g of morpholine p-toluenesulphonate, as the curing accelerator, are added to the resin solution.

The resulting resin displays turbidity only after 2 weeks and gels after 5 weeks.

When subjected to further use analogously to Example 1.1 and 1.1.1., a coated wood chipboard is obtained, the surface of which displays a uniform gloss and has a curing rating of 2–3 in the Kiton test.

If the 3.4 kg of diethylene glycol employed above are replaced by the same amount of one of the modifying agents indicated in the table which follows, the following stabilities and curing ratings (Kiton test) are obtained.

| Modifying agent | Turbidity | Gelled | Curing rating (Kiton test) |
|---|---|---|---|
| 7% of sugar | about 3 weeks | about 5 weeks | 2 |
| 7% of "mixed amide" (Example 2.2) | 2 weeks | 3 weeks | 2 |
| 7% of sorbitol | 3 weeks | 5 weeks | 2-3 |
| 7% of caprolactam | 3 weeks | 5 weeks | 2-3 |
| 7% of toluene-sulphonamide | 3-4 weeks | 5 weeks | 2 |

EXAMPLE 6

5 g of 2-dimethylaminoethanol (0.4% by weight, based on solid resin) are added to a mixture of 860 g of aqueous, 39% strength formaldehyde, 457 ml of water, 63 g of diethylene glycol, 55 g of sorbitol, 45 g of sugar and 800 g of melamine and the mixture is warmed at 90° C., whilst stirring, under a reflux condenser until the resin has a dilutability with water of 1:1.5 to 1:1.2 (about 3–4 hours).

2,285 g of melamine resin with a solids content of 54% are obtained.

0.8% of morpholine p-toluenesulphonate is added to the resin and the stability and the curing characteristics are determined. It is found that turbidity occurs after 2 weeks and gelling after 3 weeks and a rating of 2–3 is obtained for the curing, tested in accordance with the instructions of Example 1.1 and 1.1.1..

Resins with the following characteristics are obtained when other amines to be employed according to the invention are used:

| Additive 0.4% based on solid resin | Turbidity after | Gelled after | Kiton test |
|---|---|---|---|
| Tetramethylethylene-diamine | 2 weeks | 3 weeks | 2-3 |
| Di-n-butylethanolamine | 3 days | 6 days | 2-3 |
| Dimethylamino-propar-3-ol | more than 3 weeks | more than 3 weeks | 3 |
| 1-Dimethylamino-2,3-propanediol | 4 days | 8 days | 2-3 |
| 2-Dimethylaminoethyl β-hydroxyethyl ether | 3 days | 6 days | 2-3 |

If, in place of the indicated amines, 1.2 ml of 2 N sodium hydroxide solution are used for the condensation reaction, a resin is obtained which, on the addition of 0.8% of morpholine p-toluenesulphonate, becomes flocculently turbid after 10–12 hours, gels after 2 days and is completely solid after 3 days.

EXAMPLE 7

The pH value of a mixture of 860 g of aqueous, 39% strength formaldehyde, 457 ml of water, 63 g of diethylene glycol, 55 g of sorbitol, 15 g of sodium amidosulphonate and 800 g of melamine is adjusted to 10.1 to 10.3 by the dropwise addition of 5 ml of 2 N sodium hydroxide solution and the mixture is warmed at 90° C., whilst stirring, under a reflux condenser until the resin has a dilutability with water of 1:1.5 to 1:1.2 (about 3–4 hours).

2,280 g of melamine resin with a solids content of 57% are obtained. 0.4% by weight, based on the solids content, of dimethylaminoethanol and, as the curing agent, morpholine p-toluenesulphonate in one of the amounts indicated in the table which follows are then added to the resin and the curing rating is determined in the Kiton test after pressing in accordance with Example 1.1.1. for 60 seconds at 160° C. and for 90 seconds at 175° C.

The resin samples were then stored at room temperature and in this way the storage stability indicated in the table was determined, in days up to the appearance of turbidity.

For comparison, the dimethylaminoethanol was omitted in one resin sample.

| Dimethyl-ethanolamine | Curing* agent | Kiton test rating: Pressing 60 second 160° C. | Kiton test rating: Pressing 90 second 175° C. | Storage stability |
|---|---|---|---|---|
| without | 0.8% | 2 | 2 | 1 day |
| 0.4% | 0.8% | 3-4 | 2 | more than 3 weeks |

-continued

| Dimethyl-ethanolamine | Curing* agent | Kiton test rating: Pressing 60 second 160° C. | Pressing 90 second 175° C. | Storage stability |
|---|---|---|---|---|
| " | 1% | 3 | 2-3 | 3 weeks |
| " | 1.2% | 2-3 | 1-2 | 2 weeks |
| " | 1.4% | 2 | 1-2 | 10 days |
| " | 1.6% | 2 | 1-2 | 5-7 days |

*Morpholine p-toluenesulphonate

EXAMPLE 8

3,650 g of 39% strength aqueous formaldehyde, 270 g of methanol, 1,580 g of water, 25 g of dimethylaminoethanol and 3,250 g of melamine are subjected to a condensation reaction at 90° C. until the dilutability with water is 1:1.5. This resin can subsequently be modified as desired; thus, a very good fast-cycling resin is obtained when, for example, 55 g of the ε-caprolactam co-condensation product of Example 2.2 also employed as a modifying agent in Example 2 are added to 1 kg of this resin in the existing form. After adding 0.8% by weight, based on the solids content of the resin, of morpholine p-toluenesulphonate as the curing agent, a resin is obtained which is stable without change for about 3 weeks. 8.1. A white decorative paper weighing 80 g/m$^2$ was impregnated to an end weight of about 200 g/m$^2$ in the impregnating liquor, to which the curing agent had been added, and dried to a volatile content of 5.5 to 7% by weight (5 minutes/160° C.).

8.1.1. Some of the papers were then pressed onto wood chipboard on a short-cycle press under a pressure of 18 to 22 bars at a temperature of 160° C. The dwell time in the press was 60 seconds. The surfaces of the coatings displayed uniform gloss and after a heat treatment of 20 hours at 140° C. showed no cracks. Curing of the surface was likewise good; the Kiton test gave a rating of 2.

EXAMPLE 9

19.6 kg of 39% strength aqueous formaldehyde, 0.17 kg of dimethylaminoethanol, 1.5 kg of diglycol, 0.5 kg of methanol, 2 kg of sugar, 17.7 kg of melamine and 8 kg of water are subjected to a condensation reaction at 90° C. until the dilutability with water is 1:2.0. The resin was mixed with 5.8% by weight, based on the solids content, of the ε-caprolactam co-condensation product of Example 2.2 which was also employed as a modifying agent in Examples 2 and 8. After adding 0.8% by weight, based on the solids content of the resin, of morpholine p-toluenesulphonate as the curing agent, a resin is obtained which is stable without change for 3 to 6 weeks.

9.1. A white decorative paper weighing 80 g/m$^2$ was impregnated to an end weight of about 200 g/m$^2$ in the impregnating liquor, to which the curing agent had been added, and dried to a volatile content of 5.5 to 7% by weight (5 minutes/160° C.).

9.1.1. Some of the papers were then pressed onto wood chipboard on a short-cycle press under a pressure of 18 to 22 bars at a temperature of 160° C. The dwell time in the press was 60 seconds. The surfaces of the coatings displayed uniform gloss and after a heat treatment of 20 hours at 140° C. showed no cracks. Curing of the surface was likewise good; the Kiton test gave a rating of 2.

We claim:

[1. Melamine-formaldehyde resin comprising (a) melamine-formaldehyde precondensation product wherein the molar ratio of melamine:formaldehyde is 1:1.4 to 1:2.6 and (b) 0.1 to 1.0% by weight, based on total solids, of an amine of the formula]

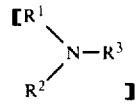

[wherein $R^1$ and $R^2$ are each identical different alkyl having 1 to 4 carbon atoms and $R^3$ is 2-hydroxyethyl, 2-(2-hydroxyethyoxy)-ethyl, 3-hydroxyl-1-propyl, 3-hydroxy-2-propyl, 2,3-dihydroxypropyl or]

$$[-CH_2CH_2-NR^1R^2.]$$

[wherein said amine may be present entirely or partially in the form of its reaction product with the melamine-formaldehyde pre-condensation product.]

[2. Melamine-formaldehyde resin according to claim 1 containing 0.2 to 1.0% by weight of said amine.]

[3. Melamine-formaldehyde resin according to claim 1 characterized in that the molar ratio of melamine:formaldehyde is 1:1.5 to 1:2.3.]

[4. Melamine-formaldehyde resin according to claim 1 containing 0.25 to 0.5% by weight of said amine.]

[5. Melamine-formaldehyde resin according to claim 1 wherein $R^1$ and $R^2$ are both methyl and $R^3$ is 2-hydroxyethyl or 2,3-dihydroxypropyl.]

[6. Melamine-formaldehyde resin according to claim 1 which additionally contains 0.5 to 40% by weight, based on total solids, of a modifying agent based on lower, saturated fatty acid amides.]

[7. Melamine-formaldehyde resin according to claim 6 wherein said modifying agent based on lower, saturated fatty acid amides is methylene-bis-formamide of the formula]

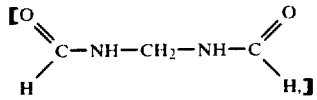

[bis-(N-acylaminomethyl) ethers of the formula]

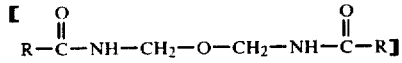

[wherein R is hydrogen or methyl, or a condensation product of ε-caprolactam, formaldehyde and formamide in a molar ratio of 1:a:b, respectively, in which a is a number from 1 to 20, b is a number from 1 to 19, and a and b are so chosen that the quotient a/(b + 1) is 0.5 to 1.]

[8. Melamine-formaldehyde resin according to claim 7 wherein a is 1 to 2 and b is 1.]

[9. Melamine-formaldehyde resin according to claim 7 containing 2.5 to 25% by weight of the modifying agent based on lower, saturated fatty acid amides.]

[10. Melamine-formaldehyde resin according to claim 1 which additionally contains a curing accelerator in an amount sufficient for curing at temperatures above 100° C.]

[11. In the process for the manufacture of the melamine-formaldehyde resin as claimed in claim 1 by a condensation reaction of melamine and formaldehyde in the presence of inorganic bases in the pH range of 8.2 to 10.4, wherein the improvement comprises (a) condensing melamine and formaldehyde in a molar ratio of 1:1.4 to 1:2.6 until a dilutability with water of 1:3 to 1:0.8 is obtained, and (b) adding before, during or after 0.1 to 1.0% by weight, based on total solids, of an amine of the formula]

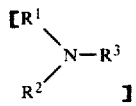

[wherein $R^1$ and $R^2$ are each identical or different alkyl with 1 to 4 carbon atoms and $R^3$ is 2-hydroxyethyl, 2-(2-hydroxyethoxy)-ethyl, 3-hydroxy-1-propyl, 3-hydroxy-2-propyl, 2,3-dihydroxypropyl or]

[$-CH_2CH_2-NR^1R^2$]

[wherein said amine may be present entirely or partially in the form of its reaction product with the melamine-formaldehyde condensation product.]

[12. Process according to claim 11 wherein said amine is added prior to the condensation reaction and replaces the inorganic base which is omitted.]

[13. In the manufacture of resin coated wood-based materials and laminates, the improvement comprises the resin being the melamine-formaldehyde resin according to claim 1.]

*14. Melamine-formaldehyde resin comprising (a) melamine-formaldehyde precondensation product wherein the molar ratio of melamine:formaldehyde is 1:1.4 to 1:2.6 and (b) 0.1 to 1.0% by weight, based on total solids, of an amine of the formula*

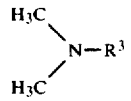

*wherein $R^3$ is 2-hydroxyethyl or 2,3-dihydroxypropyl, wherein said amine may be present entirely or partially in the form of its reaction product with the melamine-formaldehyde precondensation product and (c) 0.5 to 40% by weight, based on total solids, of a modifying agent selected from lower, saturated fatty acid amides, methylene-bis-formamide of the formula*

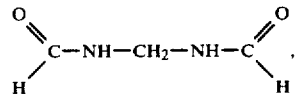

*bis-(N-acylaminomethyl ethers of the formula*

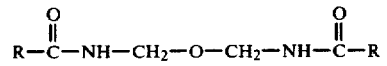

*and mixtures thereof, wherein R is hydrogen, methyl or a condensation product of ε-caprolactam, formaldehyde and formamide in a molar ratio of 1:a:b, respectively, in which a is a number from 1 to 20, b is a number from 1 to 19, and a and b are so chosen that the quotient a/(b+1) is 0.5 to 1.*

*15. Melamine-formaldehyde resin according to claim 14 containing 0.2 to 1.0% by weight of said amine.*

*16. Melamine-formaldehyde resin according to claim 14 characterized in that the molar ratio of melamine:formaldehyde is 1:1.5 to 1:2.3.*

*17. Melamine-formaldehyde resin according to claim 14 containing 0.25 to 0.5% by weight of said amine.*

*18. Melamine-formaldehyde resin according to claim 14 wherein $R^3$ is 2-hydroxyethyl.*

*19. Melamine-formaldehyde resin according to claim 14 wherein a is 1 to 2 and b is 1.*

*20. Melamine-formaldehyde resin according to claim 14 containing 2.5 to 25% by weight of the modifying agent of component (c).*

*21. Melamine-formaldehyde resin according to claim 14 which additionally contains a curing accelerator in an amount sufficient for curing at temperatures above 100° C.*

*22. In the process for the manufacture of the melamine-formaldehyde resin as claimed in claim 14 by a condensation reaction of melamine and formaldehyde in the presence of inorganic bases in the pH range of 8.2 to 10.4, wherein the improvement comprises (a) condensing melamine and formaldehyde in a molar ratio of 1:1.4 to 1:2.6 until a dilutability with water of 1:3 to 1:0.8 is obtained, and (b) adding before, during or after 0.1 to 1.0% by weight, based on total solids, of an amine of the formula*

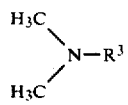

*wherein $R^3$ is 2-hydroxyethyl or 2,3-dihydroxypropyl wherein said amine may be present entirely or partially in the form of its reaction product with the melamine-formaldehyde condensation product and (c) adding before, during or after 0.5 to 40% by weight, based on total solids, of a modifying agent selected from lower, saturated fatty acid amides, methylene-bis-formamide of the formula*

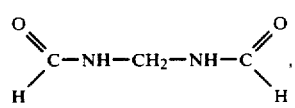

*bis-(N-acylaminomethyl) ethers of the formula*

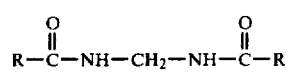

*and mixtures thereof, wherein R is hydrogen, methyl, or a condensation product of ε-caprolactam, formaldehyde and formamide in a molar ratio of 1:a:b, respectively, in which a is a number from 1 to 20, b is a number from 1 to 19, and a and b are so chosen that the quotient a/(b+1) is 0.5 to 1.*

*23. Process according to claim 22 wherein said amine is added prior to the condensation reaction and replaces the inorganic base which is omitted.*

*24. In the manufacture of resin coated wood-based materials and laminates, the improvement comprises the resin being the melamine-formaldehyde resin according to claim 14.*

* * * * *